United States Patent [19]

Abe et al.

[11] Patent Number: 4,766,446

[45] Date of Patent: Aug. 23, 1988

[54] PRINTING APPARATUS HAVING MEANS FOR PROVIDING TENSION TO A RECORDING MATERIAL

[75] Inventors: Akihiro Abe, Yokohama; Akinori Kamata, Kawasaki, both of Japan

[73] Assignee: Fujitsu Limited, Kawasaki, Japan

[21] Appl. No.: 930,254

[22] Filed: Nov. 14, 1986

[30] Foreign Application Priority Data

Nov. 19, 1985 [JP] Japan .............................. 60-259366

[51] Int. Cl.⁴ ............................................. G01D 9/00

[52] U.S. Cl. ................................................. 346/136

[58] Field of Search ........................ 346/136; 400/618; 242/189, 190; 226/10, 24, 45

[56] References Cited

U.S. PATENT DOCUMENTS 4,686,540 8/1987 Leslie et al. .................... 346/136 X

*Primary Examiner*—G. P. Tolin
*Assistant Examiner*—Derek S. Jennings
*Attorney, Agent, or Firm*—Staas & Halsey

[57] ABSTRACT

A printing apparatus includes an advancing circuit, such as a tractor, disposed on a first side of a printing head for feeding recording material. The printing apparatus has an improved tension circuit for providing adequate tension to the recording material in order to eliminate slack in the recording material, particularly during a manual feeding operation. Tension is provided by a motor driven driving roller which is disposed on a second side of the printing head opposite the first side. The driving roller is rotated in a direction in which tension is to be provided to the printing material by a tension motor. A rotary encoder, for example, is fixed to a rotating portion of the motor for driving a tractor which advances the recording material. The rotary encoder outputs position pulse signals indicating the displacement of the advancement elements. The tension motor is driven in response to the position pulse signals by a position feedback control operation performed by a control circuit. The tension circuit can also be employed in a printing apparatus which automatically advances recording material, thereby attaining the advantages set forth above.

19 Claims, 6 Drawing Sheets

PRINTING APPARATUS HAVING MEANS FOR PROVIDING TENSION TO A RECORDING MATERIAL

BACKGROUND OF THE INVENTION

The present invention is directed to a printing apparatus having means for advancing an elongated recording material. More particularly, the present invention is directed to a recording material advancing means of a printing apparatus having a motor driven tension means which provides the recording material with adequate tension during manual and automatic operation of the advancing means.

As is well known, a printing apparatus, such as a line printer, is widely used as an output device of an information processing system. FIG. 1 is a prior art printing apparatus. With respect to the apparatus in FIG. 1, a printing paper PP (hereinafter, the printing paper referred to is an elongated printing paper) is pulled up from a hopper 5, which is usually located at a lower part of the apparatus, by a recording material advancing means which includes a tractor at an upper part of the apparatus. The printing paper PP passes between a printing head 1 and a platen 2. Since a printing apparatus of this type is provided with a tractor 3 only at the upper part of the printing apparatus, easy input of printing paper PP from the hopper 5 and a simplified structure is realized.

While the printing paper PP is advanced from the hopper 5 by the tractor 3 which is driven by an advancing motor 30, the printing paper PP is apt to flap between the printing head 1 and the hopper 5. This results in lower printing quality. In order to prevent this disadvantage, tension means 4 is provided at a position between the printing head 1 and the hopper 5. The tension means includes, for example, a pair of pinch rollers consisting of a pressing roller 41 and a friction roller 40. The friction roller 40 is braked by frictional force, but is not driven by external power. The pinch roller pinches the printing paper PP between both rollers, acting as a tension load for the advancing printing paper PP. Thus, the printing paper PP passing between the printing head 1 and the platen 2 is subject to a static tension of a predetermined magnitude which suppresses the flapping of the printing paper PP during advancement of the printing paper PP. As a result, any irregular printing is eliminated. Generally, the recording material advancing means (i.e., the tractor 3), can be operated automatically or manually in conjunction with the printing head 1, under the control of a central controller which is not shown in FIG. 1.

Usually, positioning the printing paper PP is carried out before printing, and is manually performed. Thus, the automatic operation of the printing apparatus is suspended while positioning is performed. An operator advances the printing paper PP by rotating a knob 31 connected to a driving shaft of the tractor 3. When the printing paper PP is manually advanced, the printing paper PP may sometimes slacken. If an operator reverses the printing paper PP by manually rotating the knob 31 counter-clockwise, the printing paper PP will slacken as shown at 43 in FIG. 2. In the same manner, even when the printing paper PP is advanced by rotating the knob 31 clockwise, the printing paper PP may also slacken if the rotation of the knob 31 is suddenly suspended. The slack on the paper cannot be eliminated in the printing apparatus of the prior art, resulting in irregular printing, i.e., uneven printing, double printing, etc.

With respect to the manual operation of the tractor 3, another manual operation of the tractor 3 includes driving the tractor 3 by the motor 30 which is controlled by an operator. The operator turns a switch on and off so as to turn the motor 30 on and off, instead of suspending the motor 30 and advancing the tractor 3 by manually rotating the knob 31. However, with respect to slack in the printing paper PP, the cause and the counter measure for the problem are the same in both manual advancing methods. In the following description, therefore, unless otherwise mentioned, the manual operation of the recording material advancing means refers to a manual operation performed by manually rotating the knob 31.

Thus, an improved recording material advancing means for solving the problem of slack in the paper is necessary.

SUMMARY OF THE INVENTION

It is an object of the present invention to provide a printing apparatus comprising a recording material advancing means which is effective for achieving good printing quality.

It is a further object of the present invention to provide a printing apparatus with means for eliminating slack in a recording material during a positioning operation, etc., of the recording material.

The objects described above can be achieved by providing a printing apparatus according to the present invention. The printing apparatus includes a recording material advancing means disposed at a position downstream from a printing head and tension means disposed at a position upstream from the printing head. A displacement detecting means is provided to detect the displacement of the recording material. The tension means is controlled by a signal output from the displacement detecting means, and thus, necessary tension is automatically supplied to the recording material even during manual operation.

FIG. 3 is a diagram according to an embodiment of the present invention. In FIGS. 1, 2 and 3, like reference numerals denote like parts. The detecting means 32, which is, for example, a conventional rotary encoder, is connected to an advancing motor 30 to detect rotating angular displacement of the advancing motor. A tension motor 42 drives a friction roller 40 in a direction indicated by the arrow. The recording material advancing means is manually advanced or reversed when an automatic paper advancing signal PF sent from a tension controller 6 as a signal for driving the advancing motor 30 signifies an OFF condition and a non-automatic paper advancing signal NOTPF signifies an ON condition, respectively. The advancing motor 30 which is mechanically linked to the advancing means, is also rotated (see FIG. 4). Thus, position pulse signals PS are output from the detecting means 32 and are input to the tension controller 6. The tension controller 6 controls the tension means 4 to reverse the recording material for a length of time corresponding to the rotating displacement of the advancing motor 30 (i.e., the displacement of the tractor 3). In addition, the tension means 4 has a motor driven friction roller 40 which positively advances recording material, assuring there is no slack in the paper.

In summary, when the advancing means 4 and the tractor 3 are manually operated and the printing paper PP is reversed or advanced, the displacement of the printing paper PP is detected by detecting means 32, and the tension means 4 is driven in a direction reverse from the direction of the printer paper PP. As a result, adequate tension is provided to the printing paper during manual positioning of the printing paper, and slack in the printing paper which might otherwise occur, can be eliminated, resulting in high quality printing.

The details and advantages of the present invention will be apparent from the following embodiments and attached claims with reference to the drawings, wherein like reference numerals designate like parts.

DESCRIPTION OF THE PREFERRED EMBODIMENTS

There are many types of printing apparatus. In the following, the embodiments will be described with respect to a line printer. The type of printing head employed may be a dot print head. However, it should be noted that the present invention can be applied to printing apparatus and printing heads of other types. In line printers, there are three periods of printing: the image printing period, the paper feeding or advancing period, and the non-printing and nonfeeding period (i.e., the waiting period). During operation of the line printer, the printing period and the paper feeding period are repeated alternately for each line of printing. The waiting period occurs during initial paper positioning, etc. These periods are identified by signals which are peculiar to each period and which control the entire operation of the printer. The signal PF is issued from a central controller of the apparatus during an advancing period. During a waiting period, a signal NOTPF is issued in place of the signal PF. The signal NOTPF, therefore, is issued when no other signals, i.e., the signal PF, a printing signal, and an advancing signal ADVS (described later), are issued to the advancing controller 7.

Figure 1:
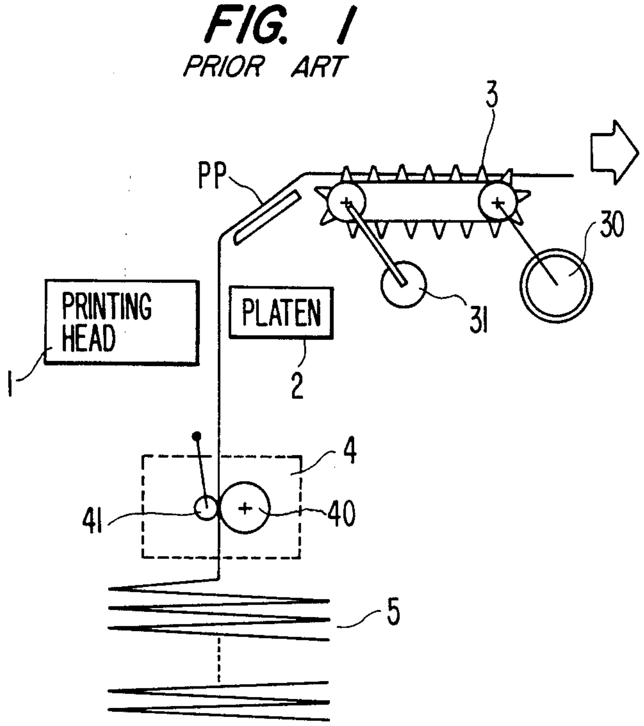
FIG. 1 PRIOR ART
FIG. 1 is a prior art printing apparatus.
Figure 2:
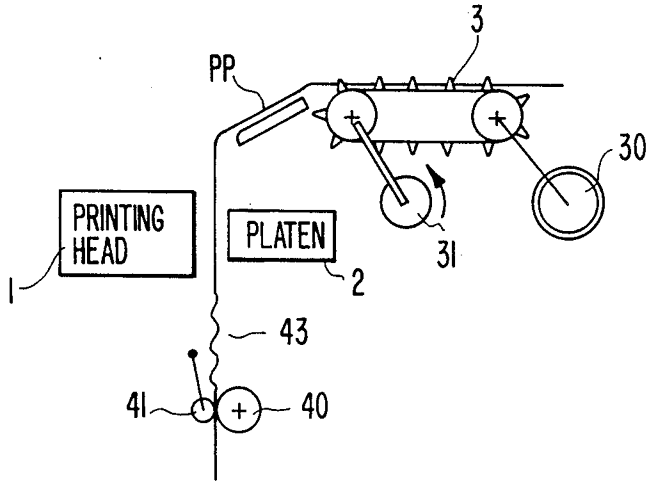
FIG. 2 PRIOR ART
FIG. 2 is a prior art printing apparatus showing slack in the recording material.
Figure 3:
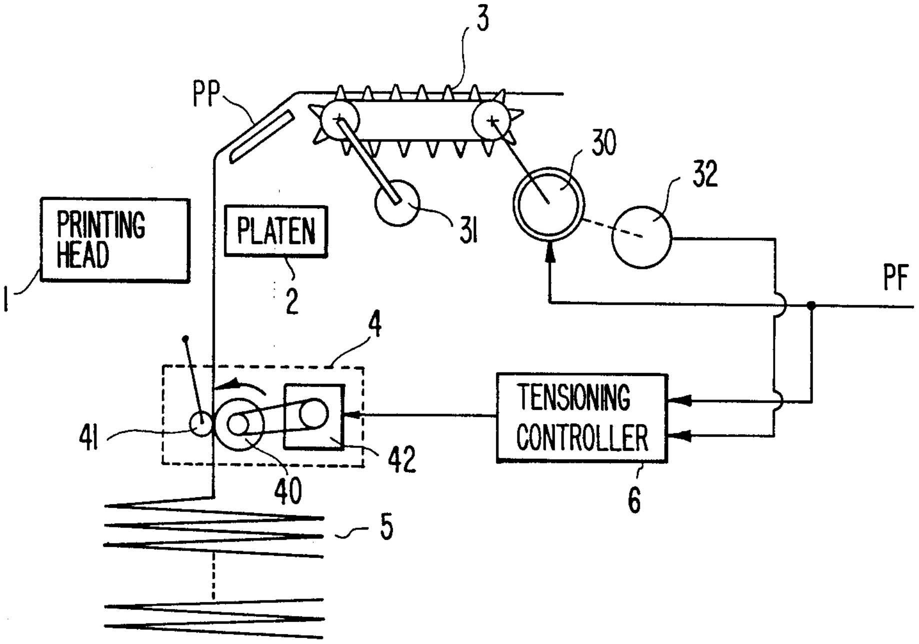
FIG. 3 is a printing apparatus according to the present invention.
Figure 4:
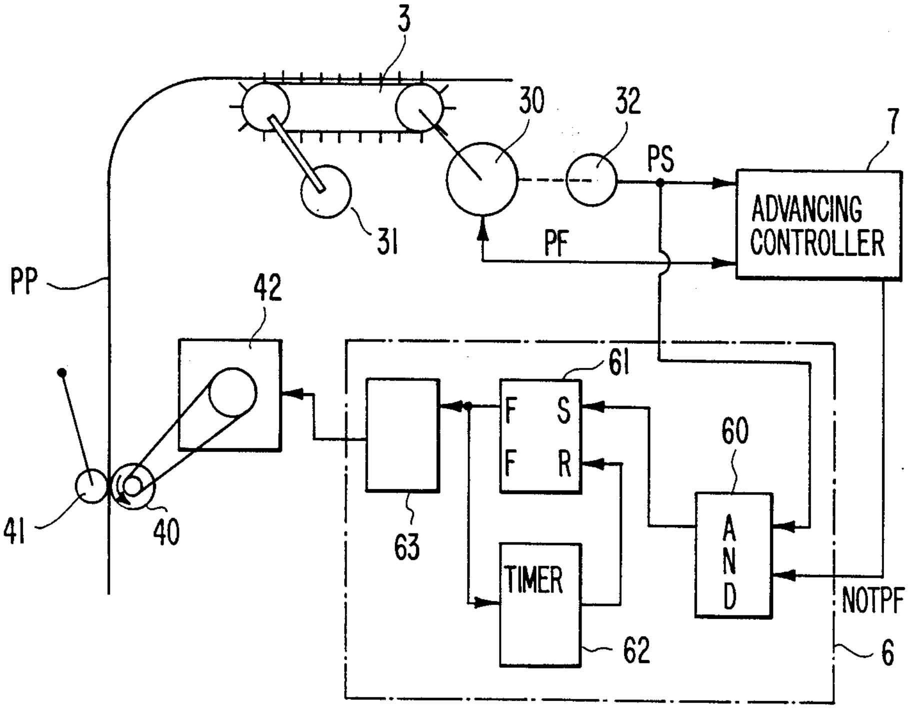
FIG. 4 is a block diagram of the tension controller in FIG. 3 according to a first embodiment of the present invention.

FIG. 4 is a block diagram of a first embodiment of the present invention. A recording material advancing controller 7 controls a printing paper PP to advance in accordance with a paper feeding signal PF or a nonfeeding or waiting signal NOTPF sent from a central controller (not shown) of the associated apparatus. The advancing controller 7 includes a conventional position feed back controlling circuit which includes a timer, a motor drive circuit, a time comparator, a register, and a PF-NOTPF signal discrimination circuit. A tension controller 6 includes an AND gate 60, a flip-flop circuit 61, a timer 62 and tension means driving circuit 63.

During an automatic operation of the recording material advancing means, including a tractor 3, the signal PF becomes ON, while the signal NOTPF becomes OFF. The signal PF enables the position feedback controlling circuit of the advancing controller 7, and drives an advancing motor 30. In this case, the advancing controller 7 receives position pulse signals PS from an encoder 32 which is fixed to the shaft of the advancing motor 30, and drives the advancing motor 30, thereby controlling the speed of the advancing motor 30.

During a manual operation of the recording material advancing means, the signal PF becomes OFF, while the signal NOTPF becomes ON. Consequently, operation of the advancing motor 30 is suspended. The signal NOTPF is discriminated by the advancing controller 7 and is fed to the tension controller 6. This opens the AND gate 60, allowing the position pulse signal PS to set the flip-flop circuit 61. A timer 62 starts counting when the flip-flop circuit 61 is set. After a predetermined time interval, the timer 62 stops and the flip-flop circuit 62 is reset. The reset output of the flip-flop circuit 61 acts as a driver signal, enabling the driving circuit 63 to drive the tension motor 42.

Operations of the recording material advancing means will be described referring to FIG. 4. During an automatic advancing operation of the printing paper PP, the signal NOTPF is OFF and the signal PF is ON. Thus, the tension controller 6 is not enabled. The advancing controller 7 outputs a drive signal in accordance with the signal PF to actuate the advancing motor 30 to drive the tractor 3. This automatically advances the printing paper PP. Simultaneously, the advancing controller 7 receives position pulse signals PS generated by the encoder 32 which is directly coupled to the shaft of the advancing motor 30, for position feedback control of the advancing motor 30. In this case, a friction driving roller 40 and a pressing roller 41 of the tension means 4 provide the printing paper PP with adequate tension. The tension is caused by a frictional force generated between the paper PP and the friction roller 40 with the aid of the pressing roller 41. As a result, the printing paper PP is advanced with adequate tension thereon.

Meanwhile, during the manual operation of the printing apparatus, the advancing controller 7 stops outputting the drive signal and the advancing motor 30 is suspended. This stops the tractor 3 and the advancement of the printing paper PP. The advancing controller 7 allows the signal NOTPF to pass during manual operation and sends the signal to the next stage which opens the AND gate 60 of the tension controller 6. When the tractor 3 is manually driven by an operator to advance the printing paper PP with a knob 31, the advancing motor 30 is rotated simultaneously in conjunction with the movement of the tractor 3 since the motor 30 is linked mechanically to the tractor 3. As a result, the position pulse signal PS is output from the encoder 32. The position pulse signal PS is then input to the tension controller 6 and to the AND gate 60 which is opened by the signal NOTPF and sets the flip-flop circuit 61. Accordingly, the flip-flop circuit 61 provides a set output signal to the driving circuit 63, which outputs a driving signal to the tension motor 42 causing the tension motor 42 to rotate and drive the friction roller 40 which rotates in the direction indicated by an arrow in FIG. 4. Thus, the printing paper PP is advanced by the friction force.

On the other hand, the timer 62 is activated when the output of the flip-flop circuit 61 is set, and remains on for a predetermined period. At the end of the predetermined period, the timer is deactivated, the flip-flop circuit 61 is reset and the set output is turned off. Thus, the driving signal output from the driving circuit 63 is OFF, suspending operation of the tension motor 42.

In this embodiment, the printing paper PP is reversed or advanced during manual operation of the recording material advancing means, i.e., the tractor 3. The tension controller 6 is triggered by a position pulse signal from the encoder 32 and is enabled for a predetermined time interval. During the predetermined time interval, tension is applied in a reverse direction by the tension means 4 to the printing paper PP to eliminate slack on the printing paper PP.

The advantage of the first embodiment is that the structure of the tension controller 6 is extremely simplified, although tension is provided to the printing paper PP only for a limited time interval (that is, for a predetermined time period). A further advantage is that tension on the printing paper PP can be applied, during manual operation of the recording material advancing means, in forward and reverse directions.

Figure 5:
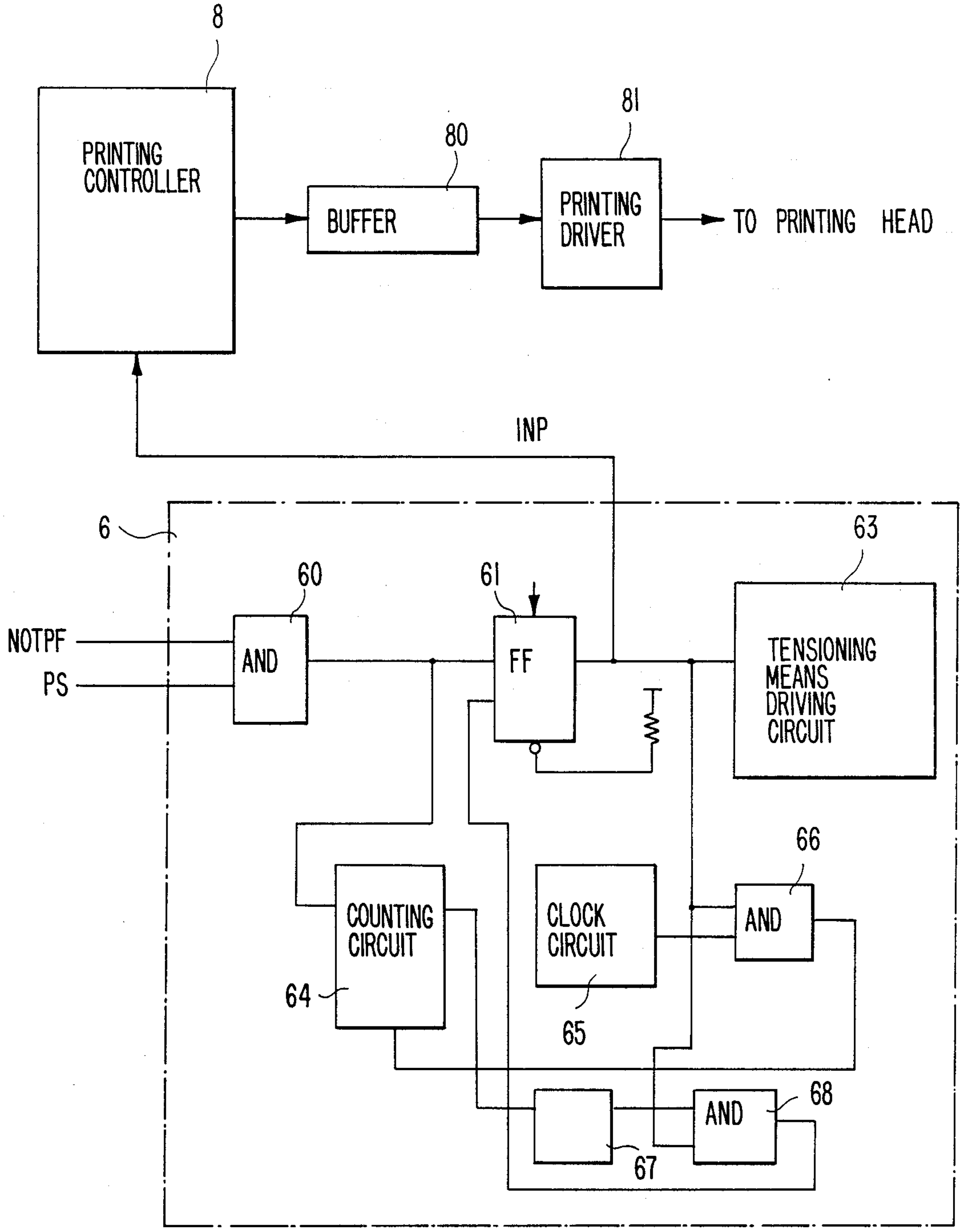
FIG. 5 is a block diagram of the tension controller in FIG. 3 according to a second embodiment of the present invention.

FIG. 5 is a diagram of a second embodiment of the present invention. The tension controller 6 further comprises a counting circuit 64, a clock circuit 65, AND gates 66 and 68, and a zero detection circuit 67 in addition to the elements in FIG. 4. The counting circuit 64 counts up the position pulse signals PS which are provided through the AND gate 60 and counts down the clock pulses output from the clock circuit 65 which has a predetermined pulse cycle. The AND gate 66 is opened by a set output from the flip-flop circuit 61, allowing the clock pulses from the clock circuit 65 to be input to the down-count terminal of the counting circuit 64. The zero detection circuit 67 generates a zero detection output signal when the content of the counting circuit 64 becomes zero. The AND gate 68 is opened by the set output of the flip-flop circuit 61 to reset the flip-flop circuit 61. A printing controller 8 controls the printing operation of the printing head 1, while a buffer 80 retains the printing data (pattern) of a single writing line sent from the printing controller 8. A printing driver 81 drives the printing head 1 in accordance with the content of the buffer 80.

In the second embodiment, a knob 31 is manually rotated for positioning the printing paper PP. The tension means 4 is driven for a time equal to the sum of the total displacement of the printing paper PP, i.e., the displacement of the recording material advancing means.

Operation of the system of FIG. 5 is now described. Like the first embodiment shown in FIG. 4, since the automatic paper advancing signal PF is not output from the advancing controller 7, the operation of the advancing motor 30 is suspended. The AND gate 60 is opened by the signal NOTPF from the advancing controller 7. When the tractor 3 is driven manually by the knob 31 under this condition, the advancing motor 30, which is mechanically linked to the tractor 3, is also rotated. As a result, the position pulse signal PS is output from the encoder 32, setting the flip-flop circuit 61. Accordingly, the driving signal is output from the driving circuit 63, thus, driving the tension motor 42 and rotating the friction roller 40 in the direction tension is desired.

The position pulse signals PS are counted up by the counting circuit 64 and, simultaneously, the AND gate 66 is opened. The counting circuit 64 then counts down the clock pulses from the clock circuit 65. The content of the counting circuit 64 is transferred to the zero detection circuit 67. When the content of the zero detection circuit 64 becomes zero, a zero detection signal is output therefrom to the AND gate 68 which resets the flip-flop circuit 61. Thus, the reset output signal of the flip-flop circuit 61 is output to the driving circuit 63 to disable operation of the tension motor 42.

Meanwhile, the set signal output from the flip-flop circuit 61 is simultaneously applied to the printing controller 8 as a printing inhibit signal INP to inhibit the printing controller 8. Thus, the printing operation of the printing head 1 is inhibited during the rotation of the tension motor 42. The number of position pulse signals PS output from the encoder 30 is proportional to the displacement of the printing paper PP advanced by the rotation of the knob 31. The tension motor 42, therefore, provides tension to the printing paper PP for a period of time proportional to the displacement of the printing paper PP. Consequently, tension control of the printing paper PP is performed, resulting in the elimination of the advancing problem of the printing paper PP caused by slack on the printing paper PP. In addition, as long as slack on the printing paper PP is not eliminated (i.e., during the time in which adequate tension is not applied to the printing paper PP), the printing operation of the printing head 1 is inhibited even though additional printing signals are input to the printing circuit 8.

Figure 6:
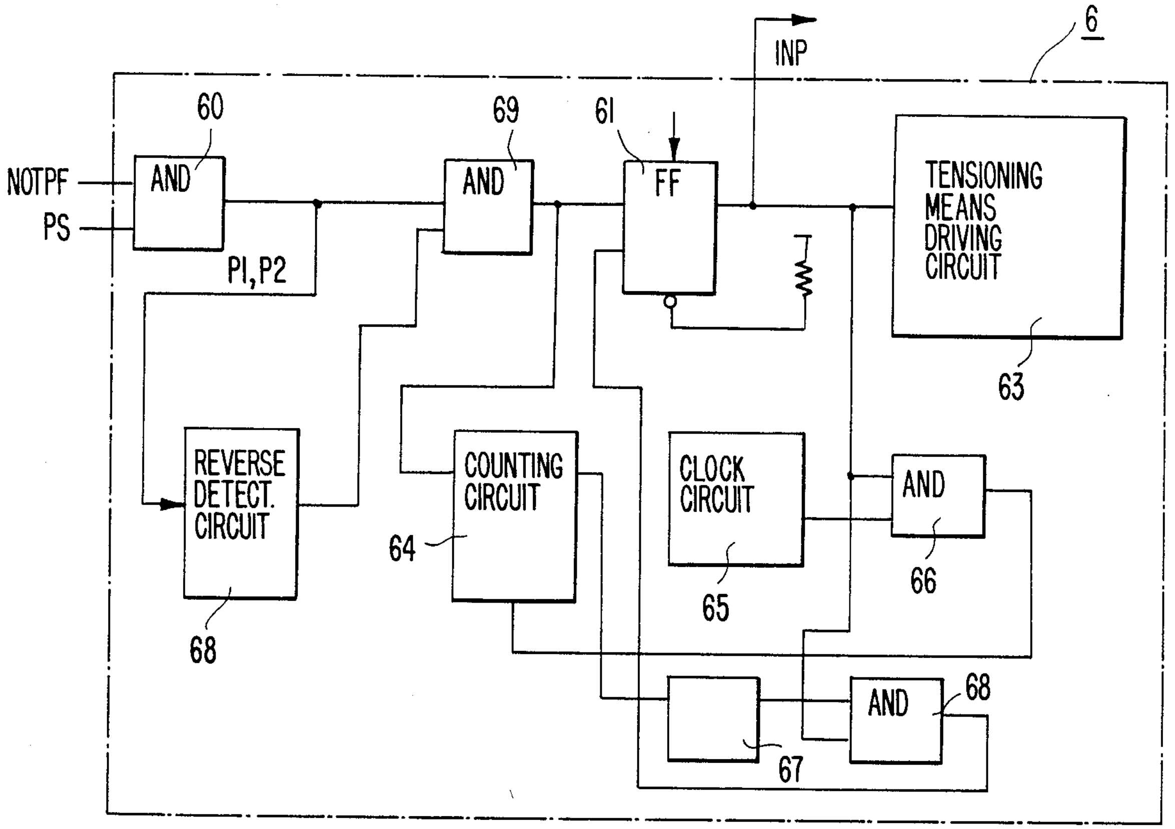
FIG. 6 is a block diagram of the tension controller in FIG. 3 according to a third embodiment of the present invention.

FIG. 6 is a block diagram of a third embodiment of the present invention. The tension controller 6 further comprises a reverse detection circuit 70, and an AND gate 69. The reverse detection circuit 70 detects reverse rotation of the advancing motor 30 by examining the time phase relationship of two position pulse signals PS having a predetermined phase displacement. The output signal of the reverse detection circuit 70 opens and AND gate 69 which allows the position pulse signals PS to be input to the flip-flop circuit 61 and the counting circuit 64.

In this embodiment, the tension means 4 is operated only when the printing paper PP is fed in the reverse direction by the knob 31 in order to eliminate slack on the printing paper PP which easily arises when the direction of the printing paper PP is reversed.

Figure 7:
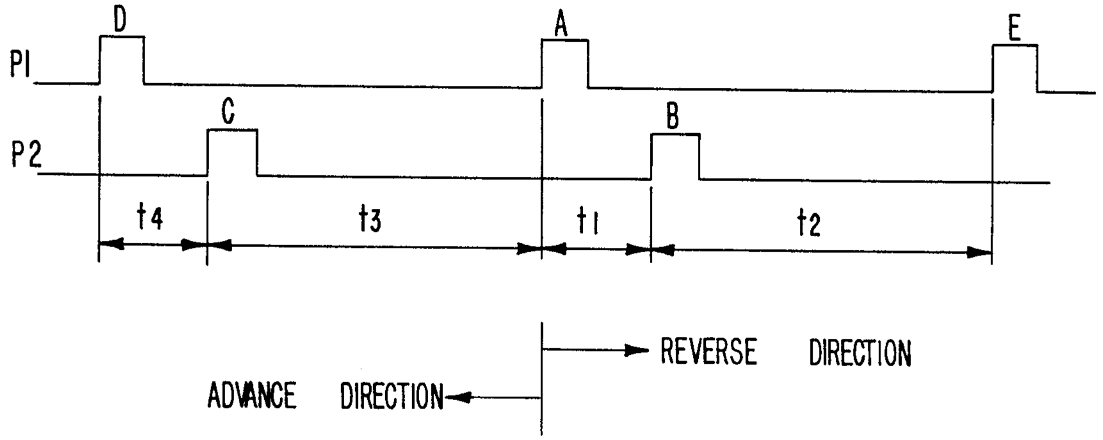
FIG. 7 is a timing diagram of output signal pulses from a detecting means shown in FIG. 6.

Operation of the third embodiment illustrated in FIG. 6 is described with reference to the timing diagrams of FIG. 7. The encoder 32 outputs trains of position pulse signals P1 and P2 which have the same time pitch and have mutually displaced phases as illustrated in FIG. 7. When a signal NOTPF transferred from the advancing controller 7 becomes ON, and AND gate 60 is opened, allowing the position pulse signals P1 and P2 to be input to the reverse detection circuit 70 for detecting reverse movement of the printing paper PP.

The structure and operation of the reverse detection circuit 70 are well known but will be briefly described. The position pulse signal P1 and the position pulse signal P2 are displaced from each other by $\pi/2$ and are simultaneously generated in the encoder 32. The starting time is defined as A and is shown in the timing diagram of FIG. 7. During the advancing operation, a position pulse signal P2(C) is generated followed by the generation of a position pulse signals P1(D). During the reversing operation, a position pulse signal P2(B) is generated followed by the generation of a position pulse signal P1(E). The reversing rotation or the advancing rotation of the advancing motor 30, therefore, can be discriminated by measuring a time interval of the position pulse signals P1 and P2 in the reverse detection circuit 70. That is, during the advancing rotation, the time interval $t_3$ up to the first position pulse signal P2(B) is longer than the time interval $t_4$ between the position pulse signal P2(C) and the position pulse signal P1(D). It is apparent by viewing the timing diagram that the relationship is reversed during the reversing operation. That is, a time interval $t_1$ is shorter than $t_2$. Thus, the reverse detection circuit 70 detects the reversing rotation of the advancing motor 30 by employing the advancing rotation of the same. During the advancing rotation operation, the AND gate 69 remains closed and does not set the flip-flop circuit 61. Consequently, the tension means 4 is not operated and tension control of the printing paper PP is not carried out.

On the other hand, when the reverse detection circuit 70 detects the reversing rotation of the advancing motor 30, it outputs a reverse detection signal, opening the AND gate 69. Thus, the position pulse signals are input to the flip-flop circuit 61 and the counting circuit 64 by way of the AND gate 60 and the same operations as those of the second embodiment illustrated in FIG. 5 are carried out. That is, a driving signal is generated for a time interval proportional to the number of position pulse signals from the flip-flop circuit 61, the tension motor 42 is driven by the driving circuit 63, and thus, tension is applied to the printing paper PP.

Figure 8:
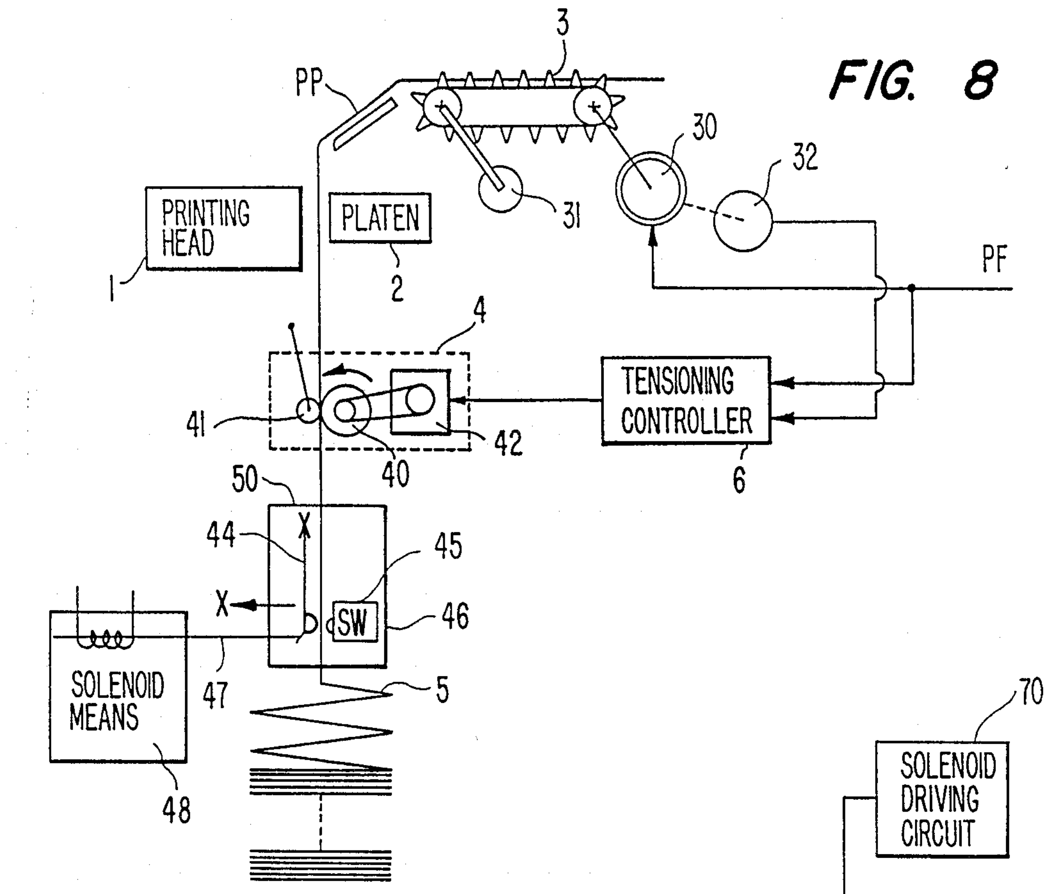
FIG. 8 is a diagram of a fourth embodiment according to the present invention.

FIG. 8 is a diagram of a fourth embodiment of the present invention. The fourth embodiment is an improvement over the third embodiment and includes means for preventing jamming of the printing paper PP when a large amount of printing paper PP is reversed. A recording material advancing means of a printing apparatus, generally, is provided with a paper end detector 50 which detects when the printing paper PP from the hopper 5 is completely exhausted. The detector 50 includes, for example, a pressing spring 44 and a switch 45 provided opposite the spring 44. The printing paper PP is pinched therebetween. When the printing paper PP is used up, the pressing spring 44 is activated and presses the switch 45, outputting an alarm signal indicating the exhaustion of the printing paper PP. Thus, the printing paper PP is always lightly pressed by the pressing spring 44. When the printing paper PP is reversed, the printing paper PP may be jammed at a position immediately downstream from the detector 50, hindering exact positioning of the printing paper PP. In order to prevent jamming of the printing paper PP, the pressing spring 44 needs to be pulled in the direction indicated by the arrow X when the printing paper PP starts to reverse. The reversing printing paper PP will freely pass through the detector 50 and drop into the hopper 5. For this purpose, a solenoid means 48 is provided as shown in FIG. 8.

Figure 9:
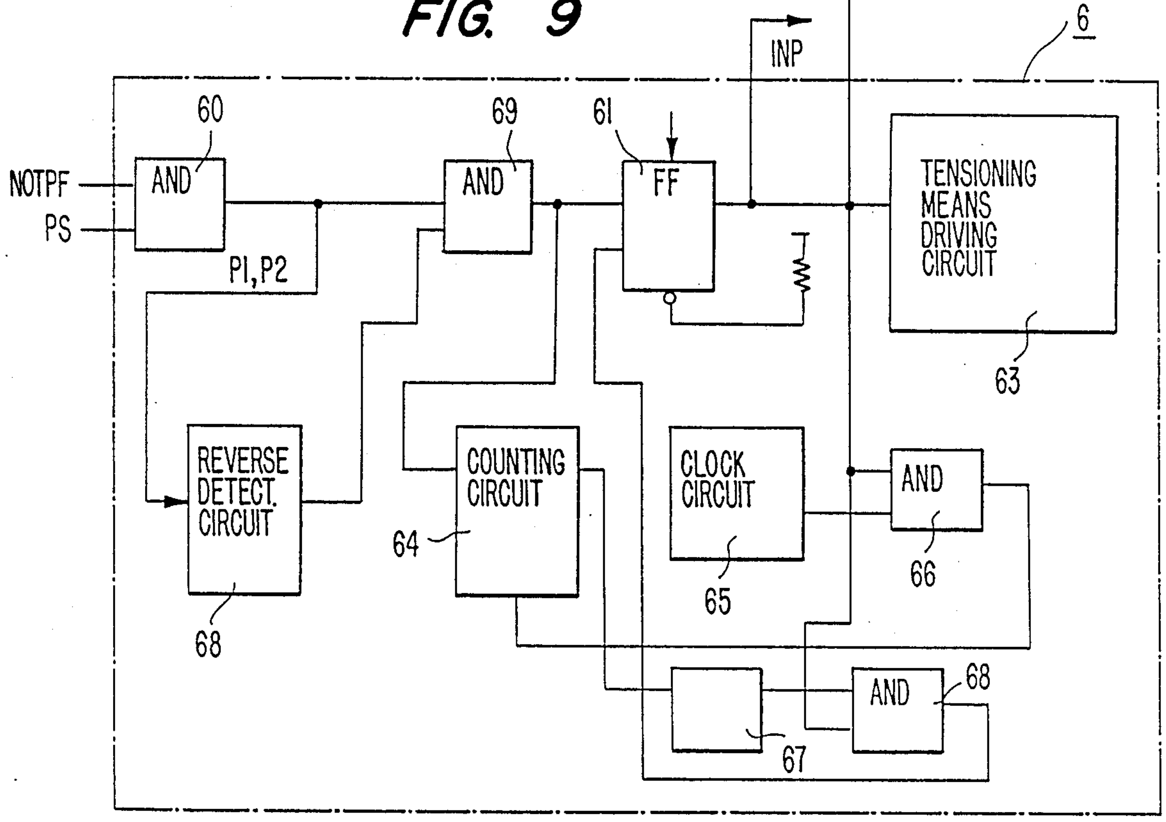
FIG. 9 is a block diagram of the tension controller and electromagnetic coil controller of the fourth embodiment of the present invention shown in FIG. 8.

FIG. 9 is a block diagram of the tension controller 6 of the fourth embodiment, where the circuit is the same as that of the third embodiment shown in FIG. 7, except for the addition of the solenoid driving circuit 71. In FIG. 9, it is apparent that the signal for driving the tension means driving circuit 63 is commonly applied to the solenoid driving circuit 71 to actuate the solenoid means 48. Thus, the tension motor 42 and the solenoid means 48 are actuated simultaneously. As a result, the pressing spring 44 is pulled away from the printing paper PP by a steel wire 47 controlled by the solenoid means 48, allowing the reversing printing paper PP to pass freely through the detector 50. Accordingly, the printing paper PP does not jam.

Hereto, the embodiments described have had a motor driven tension means for providing tension to the printing paper PP when it is reversing during manual operation of the advancing means. However, the tension means is also applicable to the advancement of the printing paper PP. In general, advancing means of a printing apparatus, such as a tractor 3, can be used to advance or reverse the printing paper, not only by hand but also automatically, as described before. A driving signal can be output by a switch, or by a program stored in a control circuit, such as a printing controller 8, in order to position the printing paper PP. Prior art tension means are not motor driven and, thus, provide the printing paper PP with static tension. Therefore, in prior art devices, it is difficult to completely eliminate slack in the printing paper PP. In some prior art, another advancing means, i.e., an additional tractor is provided at an upstream position from a printing head in order to eliminate this disadvantage. This results in an increase in the cost of the associated printing apparatus and a complicated initial setting of the printing paper PP into the hopper and advancing means.

In the fifth embodiment of the present invention, the tension means 4, which is provided in the preceding embodiments, also applies tension to the printing paper PP when it is advancing automatically. This tension means can stop the printing paper PP exactly at a specified position faster than prior art devices.

Figure 10:
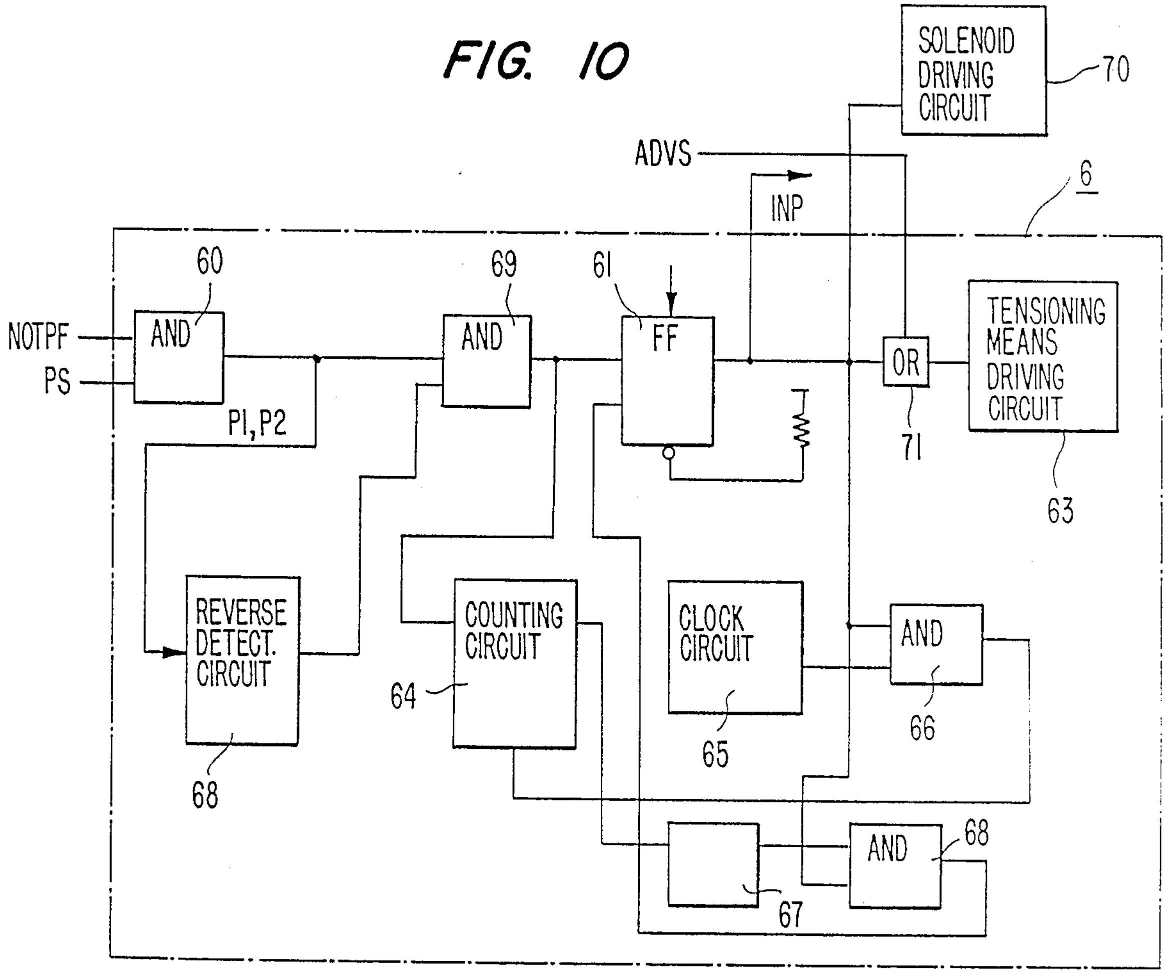
FIG. 10 is a block diagram of the tension controller in FIG. 3 according to a fifth embodiment of the present invention.
Figure 11:
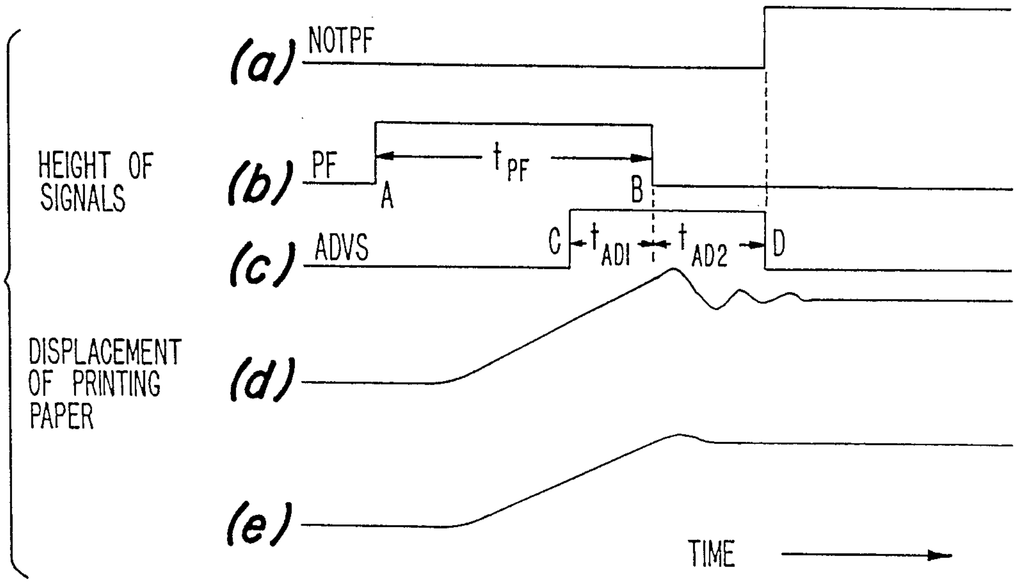
FIG. 11 is a timing diagram of signals during an advancing operation of the tractor and tension means in FIG. 10, and displacement of the advancing printing paper PP.

FIG. 10 is a block diagram of the tension controller 6 according to the fifth embodiment of the present invention. In addition to the circuit of the fourth embodiment shown in FIG. 9, an OR gate 72 is provided. FIG. 11 is a timing diagram of the signals during an advancing operation of the tractor 3 and the tension means 4, and displacement of the advancing printing paper PP. A signal PF, shown in FIG. 11(*b*), is applied to the advancing controller 7 for a time interval $t_{PF}$ for driving the advancing motor 30.

In prior art devices, the tension means is not actuated and only a static tension is applied to the printing paper PP. Consequently, the advancing displacement of the printing paper PP becomes turbulent as illustrated in FIG. 11(*d*), wherein the advancing displacement is taken along the ordinate. The printing paper PP is advanced smoothly until the signal PF is terminated at time C. However, due to inertia of the printing paper PP, the tractor 3, the moving parts of the advancing motor 30, and the backlash of the associated mechanism, the printing paper PP is subject to movement and is vibrated up and down as illustrated by the curve in 11(*d*).

In contrast, in the recording material advancing means of the fifth embodiment of the present invention, an advancing signal ADVS is transferred from a central controller (not shown), i.e., the printing controller 8 shown in FIG. 5. The signal ADVS actuates the OR gate 72 and directly drives the tension means driving circuit 63. The signal ADVS is input, before the termination of the signal PF, at a time C and terminates at a time D. The time interval $t_{AD1}$ between the times C and B, is determined in accordance with the inertia of the moving parts of the tension motor 42, the tractor 3, etc. The time interval $t_{AD2}$ between the times B and D is determined considering the backlash of an associated mechanism of the advancing means such as the tractor 3. In this manner, the printing paper PP is advanced without any flapping thereof and is exactly positioned. The advancing displacement of the printing paper PP of the fifth embodiment is illustrated in FIG. 11(*e*). In FIG. 11, the advancing means is in a waiting state after the completion of the positioning operation of the printing paper PP. If there is no further input of the signal PF and printing information stored in a preceding state, such as the buffer 80, then the non-feeding signal NOTPF is ON, as shown in FIG. 11(*a*).

In each embodiment described above, the operation of hardware of the tension controller 6 has been described, but it would be apparent to one skilled in the art that the function of the tension controller 6 can be implemented by software. Moreover, the displacement detecting means is described referring to a rotary encoder for position feedback control of the advancing motor 30. However, the device is not restricted thereto and detecting means such as an exclusive encoder, etc. may be employed.

The present invention has been described referring to several embodiments, however, the present invention permits various modifications within the scope of the subject matter of the present invention. Since numerous modifications and changes will readily occur to those skilled in the art, it is not desired to limit the invention to the exact construction and applications shown and described and accordingly, all suitable modifications and equivalents may be resorted to, falling within the scope of the invention and the appended claims and their equivalents.

What is claimed is:

1. A printing apparatus including an advancing motor, comprising:

a printing control circuit;

a printing head, operatively connected to said printing control circuit, for printing an image on a printing material and being controlled by said printing control circuit;

advancing means, located on a first side of said printing head, connected to the advancing motor, for automatically advancing said printing material by activating the advancing motor during an automatic advancing operation and for manually advancing said printing material by suspending the advancing motor during a manual feeding operation;

tension means, located on a second side of said printing head opposite said first side, for providing tension to said printing material, and including a driving roller and a tension motor connected to said driving roller for driving said driving roller;

detecting means, operatively connected to said advancing means, for detecting a feeding distance of said advancing means and outputting a displacement signal indicating said detected feeding distance; and a tension control circuit including a driving circuit, operatively connected to said tension motor and said detecting means, for driving said tension motor and for generating a tension driving signal enabling said driving circuit in response to said displacement signal during the manual feeding operation of said advancing means, said driving roller being rotated by said tension motor to provide tension to said printing material on said second side of said advancing means during the manual feeding operation of said advancing means.

2. A printing apparatus according to claim 1, wherein said printing material is elongated printing paper and wherein said advancing means is a tractor.

3. A printing apparatus according to claim 1, wherein said printing head is a dot printing head.

4. A printing apparatus according to claim 1, wherein said advancing motor includes a rotary member, wherein said detecting means is a rotary encoder, operatively connected to said rotating member of said advancing motor, for outputting said displacement signal, and wherein said displacement signal includes a train of signal pulses, the number of said signal pulses being proportional to a feeding distance of said advancing means.

5. A printing apparatus according to claim 1, wherein said tension means further comprises a pressing roller, located opposite said driving roller, for pinching said printing material in cooperation with said driving roller.

6. A printing apparatus according to claim 1, further comprising a central control circuit for supplying a signal inhibiting paper feed indicating said printing apparatus is in a writing mode, wherein said tension control circuit is enabled immediately after simultaneously receiving said signal inhibiting paper feed from said central control circuit and said displacement signal from said detecting means, and driving said tension means after a predetermined time.

7. A printing apparatus according to claim 6, wherein said advancing means outputs a signal to drive said tension means after said tension control circuit receives said displacement signal, and continues outputting said signal to drive said tension means for the predetermined time.

8. A printing apparatus according to claim 6, wherein said advancing means outputs a signal to drive said tension means after said tension control circuit receives said displacement signal, and continues outputting said signal to drive said tension means for a time interval which is proportional to the feeding distance of said advancing means.

9. A printing apparatus according to claim 8, wherein said displacement signal from said detecting means includes two trains of pulse signals having the same time pitch and having a fixed time displacement with respect to each other for detecting the direction of movement of said advancing means.

10. A printing apparatus according to claim 8, wherein the predetermined time is employed only when said advancing means is detected as being driven in a reverse direction.

11. A printing apparatus according to claim 1, wherein said printing apparatus further comprises:

a hopper located on said second side of said printing material and at a distance from said tension means, for accommodating said printing material;

pinching means, located between said hopper and said tension means, for receiving said printing material and for pinching said printing material, said pinching means including:
- a pressing spring, located on a first side of said printing material, for contacting said printing material;
- a counter plate, located on a second side of said pressing spring opposite said first side of said printing material, for pinching said printing material therebetween; and
- solenoid means mechanically linked to said pressing spring; and a solenoid driving circuit, operatively connected to said solenoid means and said tension control circuit, for activating said solenoid means, said solenoid driving circuit activating upon receipt of said driving signal, pulling said pressing spring away from said counter plate by said solenoid means, and providing a space therebetween sufficient to allow said printing material to pass freely in a reverse direction.

12. A printing apparatus according to claim 1, wherein said printing head is deactivated by said driving signal thereby inhibiting printing during the manual advancing operation of said printing material.

13. A printing apparatus having an automatic feed operation and a manual feed operation and including a printing control circuit, said printing apparatus comprising:

a printing head, connected to the printing control circuit, for printing an image on a printing material in accordance with the printing control circuit;

advancing means, located on a first side of said printing head, for advancing said printing material, being driven automatically or manually;

tension means, located on a second side of said printing head opposite said first side, for providing tension to said printing material and including:
- a driving roller; and
- a tension motor, connected to said driving roller, for driving said driving roller;

detecting means, operatively connected to said advancing means, for detecting a feeding distance of said advancing means and outputting a displacement signal indicating said feeding distance; and a tension control circuit including a driving circuit, operatively connected to said tension motor and said detecting means, for generating a tension means driving signal for enabling said tension driving circuit upon receipt of said displacement signal during the manual feeding operation, said driving roller being rotated by said tension motor for automatically providing tension to said printing material during the automatic feeding operation.

14. A printing apparatus comprising:

a printing head for printing an image on a printing material;

a printing control circuit, operatively connected to said printing head, for controlling said printing head;

an advancing motor for advancing said printing material;

advancing means, operatively connected to said advancing motor, for activating said advancing motor to automatically advance said printing material during an automatic advancing operation and for suspending said advancing motor to manually advance said printing material during a manual advancing operation;

tension control means, operatively connected to said advancing means, for controlling the tension on said printing material during the automatic advancing operation and the manual advancing operation by outputting a displacement signal; and tension means, operatively connected between said tension control means and said printing head and operatively connected to receive the displacement signal, for providing tension to said printing material in accordance with said displacement signal.

15. A printing apparatus according to claim 14, wherein said tension means comprises:

a tension motor operatively connected to said tension control means;

a driving roller, operatively connected to said tension motor, rotated by said tension motor and providing tension to said printing material during the manual advancing operation; and a pressing roller, located opposite said driving roller, the printing material moving therebetween, said driving roller and said pressing roller providing tension to said printing material.

16. A printing apparatus according to claim 15, wherein said tension control means comprises:

a first AND gate, operatively connected to said advancing means and said advancing motor, outputting an output signal;

a flip-flop, operatively connected to said first AND gate, for receiving the output signal from said AND gate;

a timer, operatively connected between an input and output of said flip-flop, providing a predetermined time to said flip-flop; and a driving circuit, operatively connected between said flip-flop and said tension means, for driving said tension motor to provide tension to said printing material.

17. A printing apparatus according to claim 16, wherein said advancing motor outputs position pulses, and wherein said tension control means further comprises:

a counting circuit operatively connected between said flip-flop and said driving circuit;

second and third AND gates operatively connected between said counting circuit and said driving circuit;

a zero detection circuit operatively connected between said second AND gate and said counting circuit; and a clock circuit, operatively connected to said third AND gate, for providing clock pulses having a predetermined pulse cycle, wherein said counting circuit counts up the position pulses provided from said advancing motor, and counts down clock pulses from said clock circuit.

18. A printing apparatus according to claim 17, wherein said tension control means comprises:

a reverse detection circuit operatively connected to said first AND gate; and a fourth AND gate operatively connected to said first AND gate and said reverse detection circuit, and having an output operatively connected to said flip-flop and said counting circuit, wherein said reverse detection circuit detects reverse rotation of said advancing motor by examining a phase relationship of said clock pulses.

19. A printing apparatus according to claim 18, further comprising:

detector means, operatively connected to said tension means, for receiving said printing material; and solenoid means, operatively connected to said detector means, for controlling the passage of said printing material through said detector means.

* * * * *

UNITED STATES PATENT AND TRADEMARK OFFICE

CERTIFICATE OF CORRECTION

PATENT NO. : 4,766,446

DATED : AUGUST 23, 1988

INVENTOR(S) : AKIHIRO ABE ET AL.

It is certified that error appears in the above-identified patent and that said Letters Patent is hereby corrected as shown below:

Col. 6, line 29, "30" should be --32--;

line 42, "circuit" should be --controller--;

line 50, "and" should be --the--.

Signed and Sealed this

Tenth Day of January, 1989

*Attest:*

DONALD J. QUIGG

*Attesting Officer* — *Commissioner of Patents and Trademarks*